United States Patent
Bruestle

(10) Patent No.: US 10,494,968 B2
(45) Date of Patent: Dec. 3, 2019

(54) OIL SEPARATOR FOR AN INTERNAL COMBUSTION ENGINE

(71) Applicant: Neanders Motors AG, Kiel (DE)

(72) Inventor: Claus Bruestle, Nordheim (DE)

(73) Assignee: Neanders Motors AG, Kiel (DE)

( * ) Notice: Subject to any disclaimer, the term of this patent is extended or adjusted under 35 U.S.C. 154(b) by 260 days.

(21) Appl. No.: 15/643,275

(22) Filed: Jul. 6, 2017

(65) Prior Publication Data

US 2018/0010496 A1   Jan. 11, 2018

(30) Foreign Application Priority Data

Jul. 7, 2016   (DE) .................. 10 2016 008 299

(51) Int. Cl.

| F01M 13/04 | (2006.01) |
|---|---|
| B01D 45/12 | (2006.01) |
| F01L 1/047 | (2006.01) |
| F02M 25/06 | (2016.01) |

(52) U.S. Cl.
CPC ............ F01M 13/04 (2013.01); B01D 45/12 (2013.01); F01L 1/047 (2013.01); F02M 25/06 (2013.01); F01M 2013/0422 (2013.01)

(58) Field of Classification Search
USPC .................................... 123/572, 573; 95/261
See application file for complete search history.

(56) References Cited

U.S. PATENT DOCUMENTS

| 4,217,120 A | * | 8/1980 | Reynolds ............... | B64D 33/00 55/385.1 |
|---|---|---|---|---|
| 4,651,704 A |   | 3/1987 | Sekiguchi |   |
| 5,899,197 A | * | 5/1999 | Watanabe .............. | F01M 13/04 123/184.42 |
| 5,954,035 A | * | 9/1999 | Hofer ..................... | F01M 13/04 123/573 |

(Continued)

FOREIGN PATENT DOCUMENTS

| DE | 1 256 476 | 12/1967 |   |   |
|---|---|---|---|---|
| EP | 2383029 A1 | * 11/2011 | ......... | B01D 46/0031 |

(Continued)

*Primary Examiner* — George C Jin
*Assistant Examiner* — Teuta B Holbrook
(74) *Attorney, Agent, or Firm* — Diederiks & Whitelaw, PLC.

(57) ABSTRACT

An oil separator is designed for an internal combustion engine with a camshaft system, via which oil separator a medium containing oil-particle-enriched blow-by gases, is influenced to the effect that the oil particles and the blow-by gases are separated and supplied to an oil circuit or to an inlet system of the internal combustion engine. The oil particles are separated from the blow-by gases by rotation of the camshaft system. In order to optimize this oil separator, the camshaft system has at least one camshaft on which a centrifugal blade device acting as the oil separator is effective. The centrifugal blade device conveys the oil particles of the medium against housing walls which are adjacent relative to the camshaft and lead to the oil circuit, with the blow-by gases freed from oil particles being conducted into the inlet system by the pressure conditions prevailing in a crankcase of the internal combustion engine.

11 Claims, 5 Drawing Sheets

(56) References Cited

U.S. PATENT DOCUMENTS

| | | | | |
|---|---|---|---|---|
| 6,003,501 | A * | 12/1999 | Shimazaki | F01M 13/022 123/572 |
| 6,152,119 | A * | 11/2000 | Hoshiba | F01M 13/0405 123/572 |
| 6,752,108 | B2 * | 6/2004 | Katayama | F01L 1/3442 123/90.15 |
| 6,758,197 | B2 * | 7/2004 | Korenjak | F01M 11/02 123/182.1 |
| 7,309,308 | B2 * | 12/2007 | Berger | F01M 13/04 123/572 |
| 7,438,065 | B2 * | 10/2008 | Matsushima | F01M 13/022 123/572 |
| 8,075,655 | B2 * | 12/2011 | Anderson | B01D 45/08 55/400 |
| 9,181,869 | B2 * | 11/2015 | Curtis | F02B 77/00 |
| 9,803,514 | B2 * | 10/2017 | Mueller | F01L 1/047 |
| 2002/0083933 | A1 * | 7/2002 | Schmid | F01L 1/047 123/572 |
| 2002/0146947 | A1 * | 10/2002 | Ishii | F01N 3/046 440/88 J |
| 2004/0144071 | A1 * | 7/2004 | Hilpert | F01M 13/04 55/406 |
| 2005/0121262 | A1 * | 6/2005 | Berger | F01M 13/04 184/6.21 |
| 2007/0175458 | A1 * | 8/2007 | Hochmayr | F01M 13/0416 123/572 |
| 2007/0215075 | A1 * | 9/2007 | Hutter | F01M 13/022 123/41.86 |
| 2007/0277762 | A1 * | 12/2007 | Takada | F01L 1/024 123/90.31 |
| 2009/0205618 | A1 * | 8/2009 | Hirota | F01M 13/04 123/572 |
| 2009/0308249 | A1 * | 12/2009 | Anderson | B01D 45/08 95/261 |
| 2009/0308338 | A1 * | 12/2009 | Tashiro | F01L 1/047 123/90.6 |
| 2011/0312427 | A1 * | 12/2011 | Meusel | F01L 1/047 464/183 |
| 2012/0080015 | A1 * | 4/2012 | Matsushima | F01M 13/04 123/573 |
| 2014/0007736 | A1 * | 1/2014 | Mueller | F01L 1/047 74/567 |
| 2015/0020760 | A1 * | 1/2015 | Kurihara | F01L 1/047 123/90.31 |
| 2017/0211436 | A1 * | 7/2017 | Kurosaka | F01L 1/053 |
| 2018/0104633 | A1 * | 4/2018 | Bonne | B01D 46/0001 |

FOREIGN PATENT DOCUMENTS

| | | | | |
|---|---|---|---|---|
| FR | 2933626 | A1 * | 1/2010 | B01D 46/0031 |
| JP | 2003148159 | A * | 5/2003 | |
| WO | WO-2005005793 | A1 * | 1/2005 | F01L 13/08 |

* cited by examiner

OIL SEPARATOR FOR AN INTERNAL COMBUSTION ENGINE

CROSS REFERENCE TO RELATED APPLICATIONS

This application claims priority under 35 U.S.C. § 119 from. German Patent Application No. DE 10 2016 008 299.2, filed Jul. 7, 2016, the entire disclosures of which are herein expressly incorporated by reference.

BACKGROUND AND SUMMARY OF THE INVENTION

The invention relates to an oil separator for an internal combustion engine with a camshaft system, via which oil separator a medium comprising oil-particle-enriched blow-by gases is influenced to the effect that the oil particles and the blow-by gases are separated and supplied to an oil circuit or to an inlet system of the internal combustion engine.

A known internal combustion engine, as disclosed in DE 1 256 476, is provided with a device for venting of the crankcase and separating of the lubricating oil entrained in the venting and recycling said medium into the oil sump of the internal combustion engine. In this embodiment, a separating chamber extending substantially over the overall height of the crankcase is provided in the crankcase. The separating chamber is connected to a crank chamber via an inlet shaft which originates from the upper end of the crank chamber and opens out close above the base of the separating chamber. A sump in the separating chamber is designed as a dry sump. The latter is connected to a gear pump which has camshaft gearwheels.

U.S. Pat. No. 4,651,704 is concerned with a venting device for an internal combustion engine which has camshafts. During the operation of the internal combustion engine, blow-by medium—blow-by gases—flows/flow through an axial bore in one of the camshafts. In the process, droplet-like oil particles are separated from the blow-by gases by centrifugal forces. And, oil particles emerge through radial bores into the camshaft. The blow-by gases are supplied to the intake device of the internal combustion engine by the system pressure in the cylinder head or cylinder crankcase by means of a line.

It is an object of the invention to design an oil separator for an internal combustion engine, which can be integrated easily and in an economically advantageous manner into a camshaft system, and which furthermore is distinguished by good operation.

This and other objects are achieved according to the invention by an oil separator for an internal combustion engine via which a medium containing oil-particle-enriched blow-by gases is influenced such that oil particles and blow-by gases are separated and supplied to an oil circuit or an inlet system of the internal combustion engine, the oil separator comprising: a camshaft system of the internal combustion engine, wherein the oil particles are separated from the blow-by gases via rotation of the camshaft system; wherein the camshaft system comprises at least one camshaft on which a centrifugal blade device acting as the oil separator is effective, wherein the centrifugal blade device conveys the oil particles of the medium against housing wall portions which are adjacent relative to the camshaft and lead to the oil circuit, with the blow-by gases freed from the oil particles being conducted into the inlet system via pressure conditions prevailing in a crankcase of the internal combustion engine.

The advantages primarily achieved with the invention can be considered that of, in order to achieve the desired effect, the centrifugal blade device, which acts as oil separator, on at least one camshaft of the camshaft system accelerates the oil particles against housing wall portions extending adjacent from the latter system, from where said oil particles are conducted into the oil circuit. And, the blow-by gases freed from oil particles are conveyed in an ingenious manner by way of the pressure conditions originating from the crankcase of the internal combustion engine into the inlet system. The centrifugal blade device can ideally be realized by a blade wheel on the camshaft of the camshaft system. The latter has two parallel camshafts which are respectively provided with a blade wheel, which contributes in a manner worthy of note to optimizing the oil separating function.

Structurally and spatially advantageous conditions are achieved if the blade wheels are arranged on end regions of the camshafts. It should be emphasized in this connection that the blade wheels are provided adjacent to at least one boundary wall, wherein the latter is provided with passage openings in the region of the camshafts. For this purpose, it should also be mentioned, still with a positive effect, that the camshafts are upright and their end regions are situated close to an upper side of the internal combustion engine, with the space which is connected to the inlet system and is intended for disposing of the blow-by gases freed from oil particles being formed above the boundary wall which is provided with the passage openings. This space is closed in a simple structural way by way of a trough-shaped cover which is provided with a connecting stub for the inlet system. An expedient solution is that, on the side remote from the space, the blade wheels are fixed on the camshaft gearwheels which, for example, are mutually in engagement. As a first example, each blade wheel has a disk-shaped annular part which is provided with a receiving bore for a bearing pin portion of the camshaft and has one or more passage openings. And, as a second example, the blade wheel is held on the gearwheel of the camshaft using axially acting screws penetrating the passage openings in the annular part. This solution is supplemented by the fact that, firstly, each blade wheel comprises a multiplicity of blades which are distributed uniformly over the circumference of the annular part and extend in the axial direction toward the boundary wall, and, secondly, the axial blades have a rectangular shape.

Finally, standards are set if the annular part and the blades are produced from one piece, and if the blade wheel is composed of plastic, light metal, steel or the like, wherein the blade wheel is composed of nylon and is produced by injection molding.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
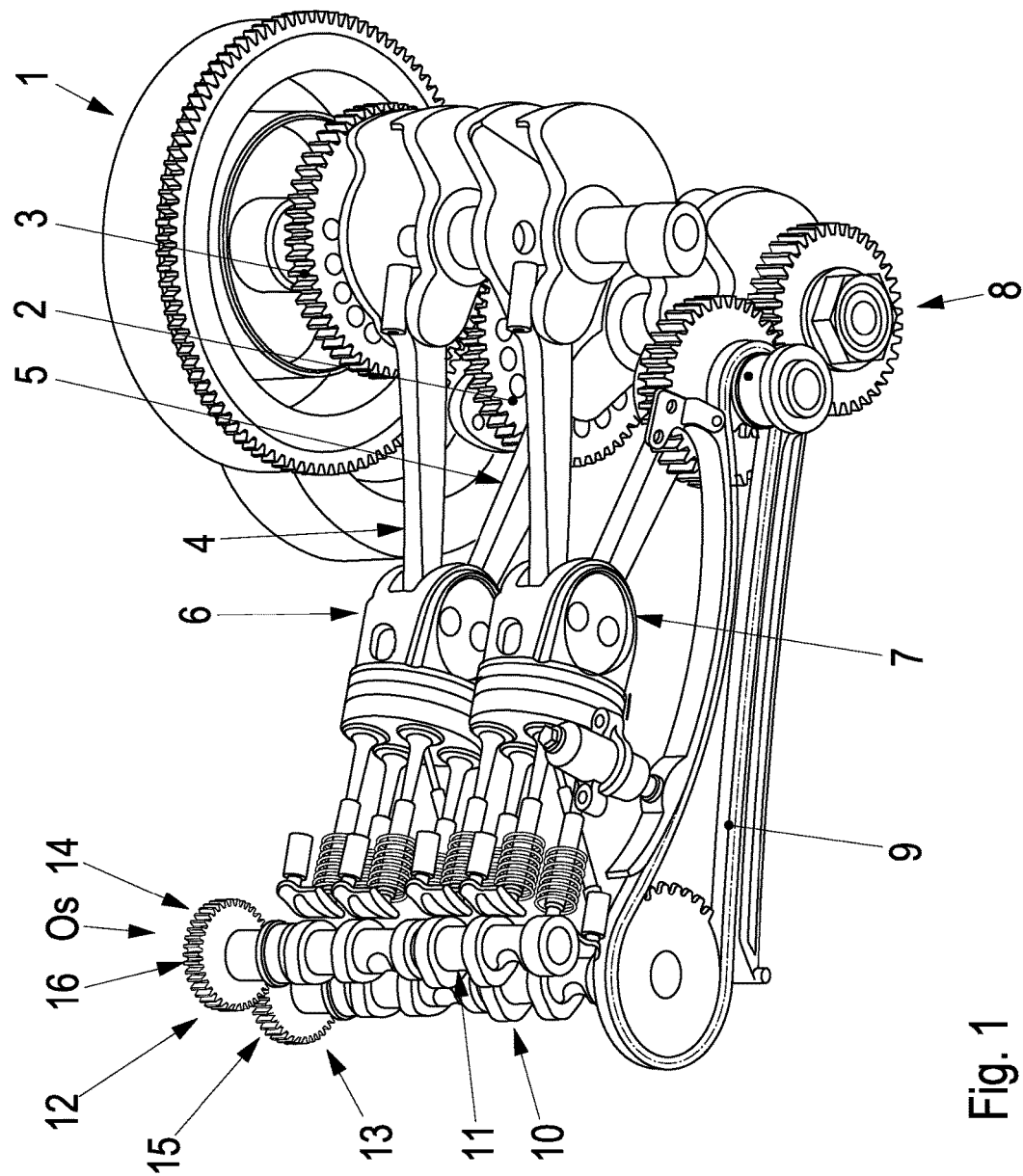
FIG. 1 is a schematically illustrated internal combustion engine with two crankshafts and a camshaft system comprising two camshafts.
Figure 2:
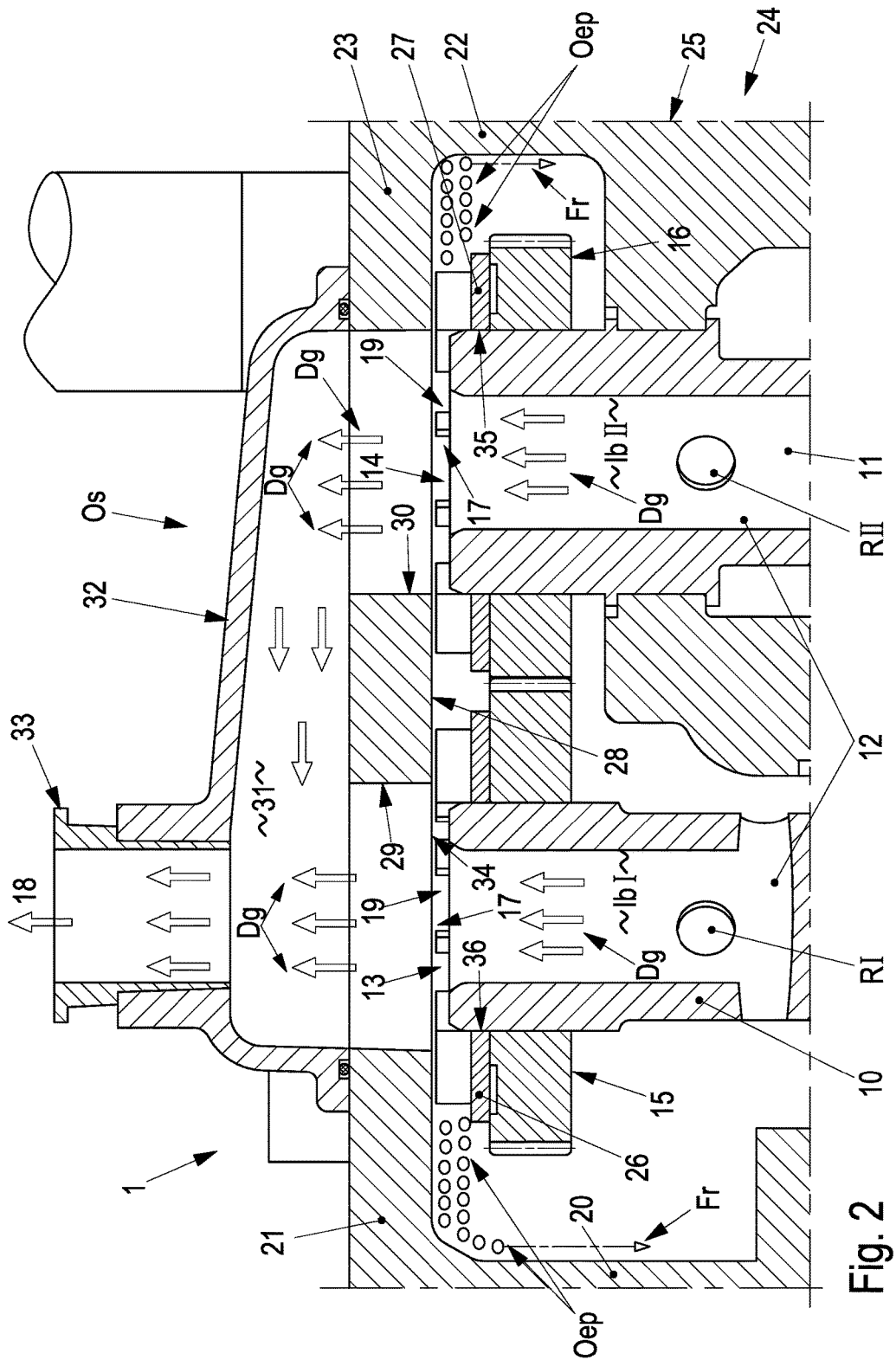
FIG. 2 is a partial section of the internal combustion engine with an oil separator in the region of end regions of the camshafts, specifically adjacent to an upper side of the internal combustion engine, according to FIG. 1.

An internal combustion engine 1 serves for driving watercraft, land vehicles or the like and operates using diesel with direct injection, wherein an exhaust gas turbocharger device is provided for optimizing the operation. Two parallel crankshafts 2 and 3 extending upright are driven via, in each case, two connecting rods 4 and 5 of one of two pistons 6 and 7. One of the crankshafts, e.g. crankshaft 2, influences a cylindrical gearing 8 which, with the interconnection of an endless drive 9, drives one of two parallel camshafts 10 and 11 of a camshaft system 12, said camshafts likewise being oriented upward. The camshafts 10 and 11, which are provided with axial internal bores IbI and IbII and radial bores RI and RII, interact on end regions 13 and 14 via two gearwheels 15 and 16 which are mutually in engagement—FIG. 2—and are connected to said camshafts 10 and 11 with a force fit, for example by shrinking thereon. More precise details relating to the abovementioned "double crankshaft internal combustion engine" 1 are described in EP 2 696 054 A1.

The internal combustion engine 1 has an oil separator 17 by means of which a medium comprising oil-particle-enriched blow-by gases is treated. The oil particles Oep and the blow-by gases Dg—FIG. 2—are extensively separated from each other and are supplied as a type of film Fr to an oil circuit or to an inlet system 18 connected to combustion chambers for receiving air/fuel—said oil circuit is not illustrated. The oil particles are separated from the blow-by gases Dg by rotation of the camshaft system 12. However, blow-by gases Dg from which oil particles are removed also flow into the inlet system 18 via the internal bores IbI and IbII of the camshafts 10 and 11.

A centrifugal blade device 19 is effective on at least one of the camshafts, e.g. camshaft 10, said centrifugal blade device 19 conveying the oil particles of the medium to be treated against housing wall portions 20, 21 and 22, 23 of a machine housing structure 24, for example a cylinder head 25 of the internal combustion engine 1, said housing wall portions being adjacent relative to said camshaft 10 and leading to the oil circuit. In other words, the droplet-like oil particles Oep held against the housing wall portions 20, 21 and 22, 23 expand at said housing wall portions and slide, as already mentioned, as a film Fr in the direction of the oil circuit or oil pan of the internal combustion engine 1. And, by means of the pressure conditions prevailing in a crankcase (not shown), the blow-by gases Dg freed from oil particles OeP are conducted into the inlet system 18—FIG. 2.

The centrifugal blade device 19 includes a blade wheel 26 which is connected to the camshaft 10 for rotation therewith. In the case of the camshaft system 12, which indeed has two camshafts, namely 10 and 11, blade wheels are provided on said two camshafts 10 and 11, specifically the blade wheel 26 on the camshaft 10 and a blade wheel 27 on the camshaft 11.

The blade wheels 26 and 27 are fastened in the vicinity of the end regions 13 and 14 of the camshafts 10 and 11, and the blade wheels 26 and 27 run adjacent to a boundary wall 28 of the cylinder head 25. The boundary wall is oriented transversely with respect to the camshafts 10 and 11 forming the housing wall portions 21 and 22. The boundary wall 28 of the cylinder head 25 is provided with bore-like passage openings 29 and 30 in the region of the camshafts 10 and 11.

The camshafts 10 and 11 which, as described above, are upright in the internal combustion engine 1, are situated with their end regions 13 and 14 in the vicinity of an upper side Os of the internal combustion engine 1. A space 31 for disposing of the blow-by gases Dg freed from oil particles Oep is formed above the boundary wall 28 of the cylinder head 25, said boundary wall being provided with the passage openings 29 and 30. The space 31 is covered using a, for example, cross-sectionally trough-shaped hood 32 which is provided with a connecting stub 33 leading to the inlet system 18.

Figure 3:
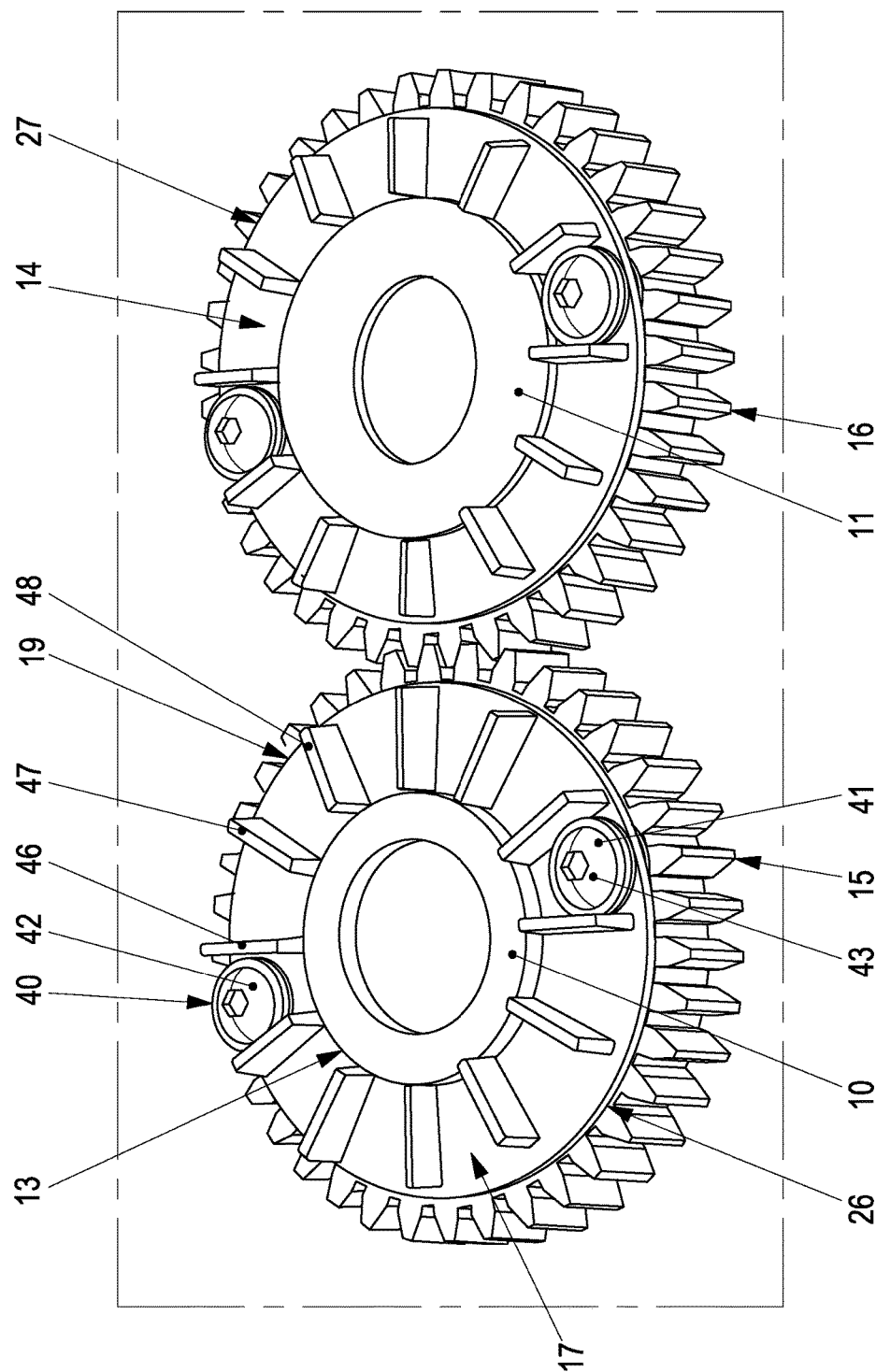
FIG. 3 is an oblique view of the end regions of the camshafts with the blade wheels forming oil separators according to FIG. 2.

On a side 34 of the boundary wall 28 that faces away from the space 31, the blade wheels 26 and 27 lie against the camshaft 10 and 11 gearwheels 15 and 16 which, for example, are mutually in engagement—FIG. 3—and at which the blade wheels 26 and 27 are held in position. Each blade wheel, e.g. blade wheel 26, has a disk-like annular part 37—FIG. 4—which is provided with a receiving bore 35 for a bearing pin portion 36—FIG. 2—of the camshaft 11 and into which one or more passage bores 38 and 39 are incorporated. The blade wheels 26 and 27 are fastened to the gearwheels 15 and 16 using axially acting screws 40 and 41 which penetrate said passage bores 38 and 39 and have screw heads 42 and 43—FIG. 3. In the region of the screw heads 42 and 43, supporting disks 44 and 45 for said screw heads are provided on the annular part 37.

Figure 4:
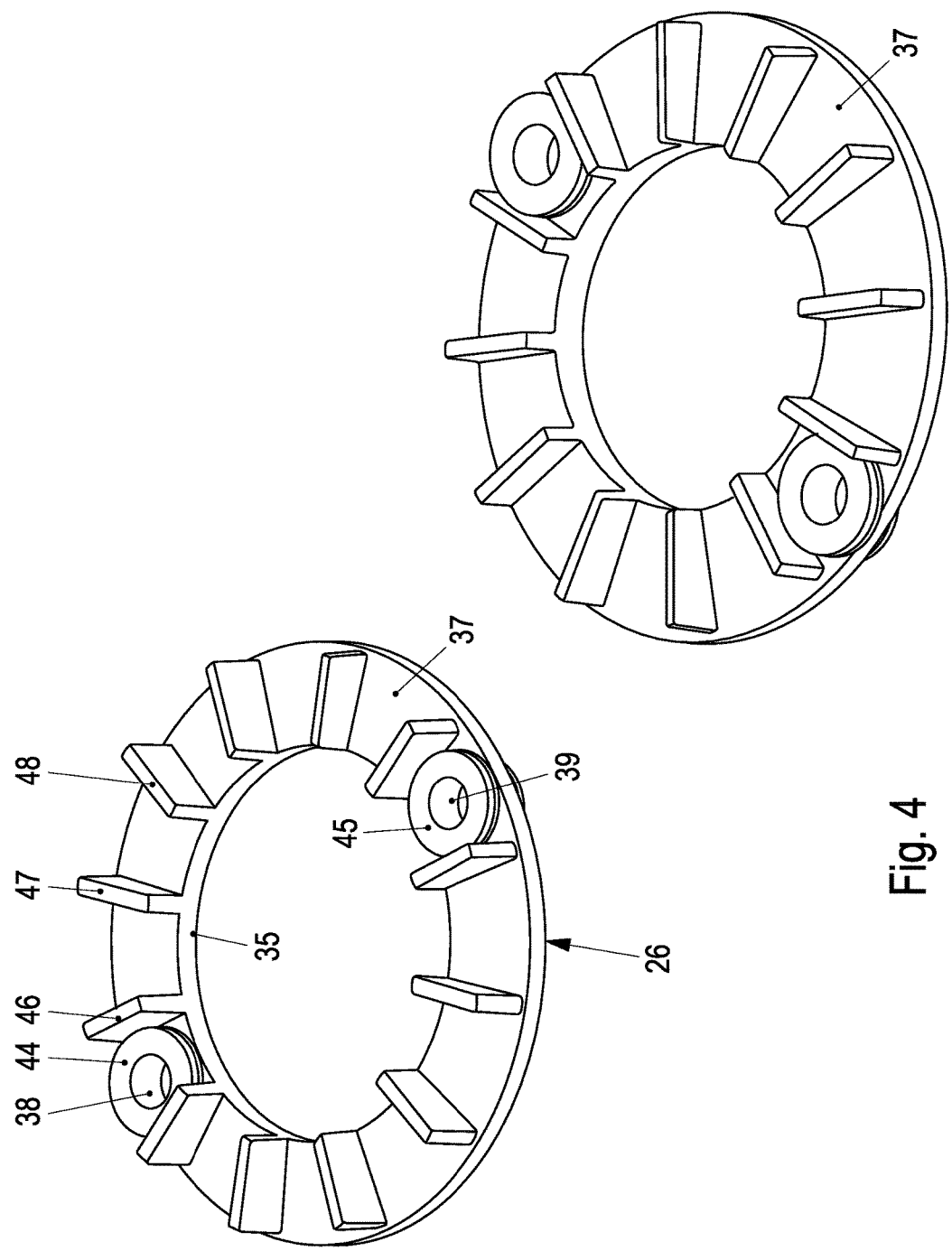
FIG. 4 is an oblique view of individual parts of the blade wheels according to FIG. 3.
Figure 5:
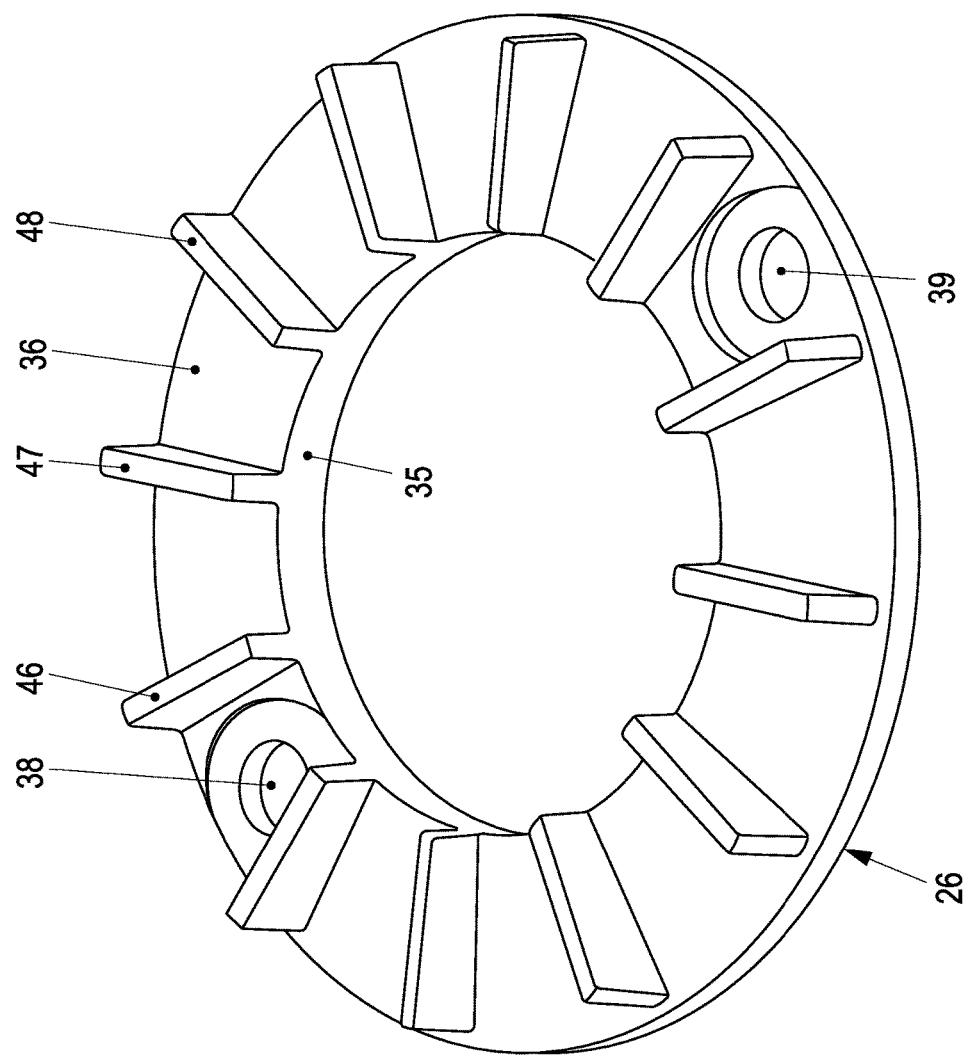
FIG. 5 is an oblique view of one of the blade wheels according to FIG. 4.

A plurality of, e.g., twelve blades 46, 47, 48, etc. —FIGS. 3 and 4—are provided. The blades are distributed uniformly over the circumference of the annular part 37 of the blade wheel 26 and extend in the axial direction, specifically toward the boundary wall 28. The axial blades 46, 47, 48, etc. have a rectangular flat shape. However, it is also contemplated to use blades which have a curved—concave or convex—shape. The annular part 37 and the blades 46, 47, 48, etc. are produced from one piece; with plastic, light metal, steel or the like being particularly suitable for producing the blade wheels 26 and 27. Finally, considerations over the course of the development of the blade wheels 26 and 27 have led to the material nylon, processed by injection molding, having good properties for this application.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An oil separator device for an internal combustion engine comprising:

an oil separator having a centrifugal blade device with blade wheels, and a camshaft system having two parallel camshafts, a medium comprising oil-particle-enriched blow-by gases being influenced via said oil separator in such a way that oil particles of the medium and the blow-by gases are fed separately to the internal combustion engine, separation of the oil particles from the blow-by gases taking place by rotation of the centrifugal blade device of the oil separator in cooperation with the camshaft system, wherein:

the centrifugal blade device conveys the oil particles of the medium towards housing wall sections that are adjacent relative to the camshaft system and lead to an oil circuit, by way of pressure conditions prevailing in a crankcase of the internal combustion engine, the blow-by gases freed from the oil particles are conducted into an intake system of the internal combustion engine, the two parallel camshafts of the camshaft system each being connected to one of the blade wheels of the centrifugal blade device so that the blade wheels are arranged at end regions of the two parallel camshafts, and the blade wheels are arranged adjacent to at least one boundary wall of a cylinder head, the at least one boundary wall being provided with passage openings at the end regions of the two parallel camshafts.

2. The oil separator device according to claim 1, wherein the two parallel camshafts are upright, said end regions lie near an upper side of the internal combustion engine, and a space connected to the intake system is formed above the at least one boundary wall provided with the passage openings for disposal of the blow-by gases, freed from the oil particles.

3. The oil separator device according to claim 2, wherein the space is arched over by a hood formed as a trough, and wherein the hood is provided with a connecting piece for the intake system.

4. The oil separator device according to claim 2, wherein, on a side of the at least one boundary wall remote from the space, the blade wheels rest against the camshafts and against gear wheels of the camshafts in mutual engagement and against which the blade wheels are held in position.

5. The oil separator device according to claim 4, wherein each blade wheel has an annular part provided with a receiving bore for a bearing journal portion of one of the camshafts and having at least one opening.

6. The oil separator device according to claim 5, wherein each blade wheel is held by axially acting screws that penetrate through-holes at opposite portions of the annular part, and each blade wheel is held on an associated one of the gear wheels of the camshaft.

7. The oil separator device according to claim 6, wherein each blade wheel comprises a plurality of blades distributed around the periphery of the annular part and extending axially towards the at least one boundary wall.

8. The oil separator device according to claim 7, wherein each of the blades has a rectangular shape.

9. The oil separator device according to claim 8, wherein the annular part and the blades distributed around the periphery of the annular part are made of one piece.

10. The oil separator device according to claim 9, wherein each blade wheel consists of plastic, light metal, or steel.

11. The oil separator device according to claim 10, wherein each blade wheel consists of polyamide 6.6 and is produced by injection molding.

* * * * *